United States Patent
Mori et al.

(10) Patent No.: US 6,547,555 B2
(45) Date of Patent: Apr. 15, 2003

(54) REGENERATIVE HEAT SENSOR RESERVOIR FOR COMBUSTION BURNER

(75) Inventors: Isao Mori, Tokyo-to (JP); Yutaka Suzukawa, Tokyo-to (JP); Jun Sudo, Yokohama (JP); Yoshiyuki Kasai, Nagoya (JP)

(73) Assignees: NKK Corporation, Tokyo (JP); Nippon Furnace Kogyo Kaisha, Ltd., Yokohama (JP); NGK Insulators, Ltd., Nagoya (JP)

( * ) Notice: Subject to any disclaimer, the term of this patent is extended or adjusted under 35 U.S.C. 154(b) by 0 days.

(21) Appl. No.: 10/129,741
(22) PCT Filed: Sep. 11, 2001
(86) PCT No.: PCT/JP01/07890
§ 371 (c)(1),
(2), (4) Date: May 10, 2002
(87) PCT Pub. No.: WO02/23113
PCT Pub. Date: Mar. 21, 2002

(65) Prior Publication Data
US 2002/0192614 A1 Dec. 19, 2002

(30) Foreign Application Priority Data
Sep. 13, 2000 (JP) ......................................... 2000-278580

(51) Int. Cl.[7] ............................................... F23D 11/44
(52) U.S. Cl. ......................................... 431/215; 431/11
(58) Field of Search ........................ 431/215, 11; 165/4, 165/10

(56) References Cited

U.S. PATENT DOCUMENTS 5,515,909 A * 5/1996 Tanaka ........................... 165/4
5,520,534 A * 5/1996 Nakagawa et al. ......... 431/215
5,992,504 A * 11/1999 Kumazawa et al. ......... 165/9.2

FOREIGN PATENT DOCUMENTS

| EP | 0 687 879 A | 12/1995 |
| EP | 0 724 126 A | 7/1996 |
| EP | 0 939 289 A | 9/1999 |
| JP | 11-30491 A | 2/1999 |

* cited by examiner

*Primary Examiner*—Henry Bennett
*Assistant Examiner*—Alfred Basichas
(74) *Attorney, Agent, or Firm*—Frishauf, Holtz, Goodman & Chick, P.C.

(57) ABSTRACT

In a regenerator made of materials each comprising alumina as a main ingredient, and used for the regenerative combustion burner which is fired with alternately and repeatedly operations of heat storage by the passage of high-temperature flue gas in a fixed time and heating of combustion air by passage of the combustion air in a next fixed time, under the condition that the flue gas includes metal dust; the alumina purities in the materials for the regenerator are lowered in the order, the high-temperature, medium-temperature and low-temperature parts of the regenerator.

6 Claims, 10 Drawing Sheets

CLOGGING RATIO (%) = (A1−A2)/A1×100

(IN CASE OF EXISTENCE OF METAL DUST)

(IN CASE OF NONEXISTENCE OF METAL DUST)

REGENERATIVE HEAT SENSOR RESERVOIR FOR COMBUSTION BURNER

This application is a U.S. National Phase Application under 35 USC 371 of International Application PCT/JP01/07890 (not published in English) filed Sep. 11, 2001.

TECHNICAL FIELD

This invention relates to a regenerator for regenerative combustion burner, particularly, to a regenerator for regenerative combustion burner which has a long operation life, a capability of stable and high yield heat recovery during an extended term, and a possibility of realizing a reduced pressure loss.

BACKGROUND ARTS

Now, referring to drawings, the regenerative combustion burner will be explained by an example where the regenerative combustion burners are installed in the heating furnace. FIG. 1 is a schematic sectional view of the heating furnace that the regenerative burners are installed. In FIG. 1, the numeral 1 denotes a heating furnace; the numerals 2a, 2b denote paired regenerative burners, respectively, wherein the paired burners are arranged on the furnace wall and face each other; and the numeral 3a, 3b denote a regenerator, respectively, wherein each regenerator is established at the regenerative burner 2a, or 2b. The regenerators 3a and 3b are preferably to have a large specific surface, and are generally made of plural honeycomb structure bodies. The numeral 4a and 4b denote a fuel shut-off valve respectively, and pressurized fuel is supplied from a fuel supply source which is not shown to burners 2a and 2b at a predetermined flow rate, while these valves have opened. The numeral 5a and 5b denote a combustion air valve respectively, and pressurized air is supplied from air supply source which is not shown to burners 2a and 2b at a predetermined flow rate, while these valves have opened. The numeral 6a and 6b denotes a flue gas valve respectively, and the flue gas (hereinafter, referred as "furnace internal gas") which has passed through the regenerator 3a and 3b is drawn at a predetermined flow rate by an exhaust blower which is not shown, and it is discharged to the atmosphere, while this valve has opened.

In FIG. 1, when, for example, one burner 2a is in the fired condition, the fuel shut-off valve 4a is opened in order to supply the fuel thereto. And, the combustion air valve 5a is opened and the flue gas valve 6a is closed in order to push the air into one regenerator 3a. The air which has passed through the regenerator 3a, by taking a heat from the regenerator, becomes high-temperature tempered air, and then, it is supplied to the burner 2a.

At the same period, in the other burner 2b, both of the fuel shut-off valve 4b and the combustion air valve 5b are closed, and flue gas valve 6b has opened. The furnace internal gas is drawn from burner 2b, and it is exhausted by the exhaust blower, after it passes through the regenerator 3b so that its heat is stored to the regenerator 3.

In the case of regenerative combustion in the heating furnace 1 using above mentioned regenerative burner 2a and 2b, alternate combustion which alternately switches the combustion burner 2a and 2b every the fixed time is done.

When the combustion is changeover and the other burner 2b is in the fired condition, the combustion fuel shut-off valve 4b and combustion air valve 5b are opened together and the flue gas valve 6b is closed so as to supply the air to the other regenerator 3b. The air which passed through the regenerator 3b being in high-temperature absorbs heat from the regenerator 3b, and it becomes the high-temperature tempered air to be supplied to the burner 2b.

In the meantime, in the burner 2a, the fuel shut-off valve 4a and combustion air valve 5a are closed together, and the flue gas valve 6a is opened, and thus the furnace internal gas is drawn from burner 2a, and it is exhausted by the exhaust blower, after it passes through the regenerator 3a so that its heat is stored to the regenerator 3a.

At a separate pair of burners 2a1, 2b1, which are adjacent to the foregoing paired burners 2a, 2b, in the longitudinal direction of the furnace, a similar alternate combustion is done. However, the timing of the combustion is different. That is to say, when the burner 2a is in combustion, the adjacent burner 2a1 is in heat storage condition.

Generally, as a material of the regenerator, ceramics such as alumina and cordierites, etc. are used. The life of the regenerator is greatly changed by temperature of the flue gas and use environments such as the existence of the metal dust in the flue gas. When the choice of material for the regenerator is improper, therefore, fuse or cracking of regenerator may be happened and/or clogging of regenerator may be caused, which are followed by the drastically shortened lifetime of regenerator, and at worst led into the condition of inoperative due to the reduced heat-recovery and the heightened pressure loss.

Especially, in case of the alumina, that has the alumina purity of about 97% and the porosity of over 30% is usually used. Thus, in case that the high-temperature exhaust gas involves metal dust and being in amply high temperature, the fuse of regenerator can be happened by the reaction with the metal dust, and which is followed by the inoperative result. In addition, the life of the regenerator is greatly affected by alumina purity and porosity. Incidentally, the porosity showed the volume ratio of the pore in the material.

When comparing alumina with cordierite, the price of the alumina is generally higher than that of the cordierite. Further, as the purity goes up, and as the porosity goes down, the alumina tends to costlier.

The present invention, therefore, aims to provide a regenerator for the regenerative combustion burner capable of maintaining a stable heat recovery and low pressure loss in the long term, in keeping with low cost and by adopting an optimum construction, after clarifying the durability of alumina under a given alumina purity, given porosity, given atmosphere temperature and given condition for existence or nonexistence of the metal dust, or after clarifying the working condition of cordierite under a given atmosphere temperature and given condition for existence or nonexistence of the metal dust.

DISCLOSURE OF THE PRESENT INVENTION

The first invention is characterized by the fact that, in a regenerator made of the materials each comprising alumina as a main ingredient, wherein the regenerator is used in a regenerative combustion burner being fired with alternately and repeatedly operations of heat storage by the passage of high-temperature flue gas in a fixed time and heating of combustion air by passage of the combustion air in a next fixed time; and the regenerator is used under the condition that the aforesaid flue gas includes metal dust;

the alumina purities in the materials for the regenerator are lowered in the order, the high-temperature, medium-temperature and low-temperature parts of the regenerator.

The second invention is characterized by decreasing the porosity of the aforesaid high temperature part in comparison with the porosity of the medium temperature part.

The third inventions is characterized by the fact that, in a regenerator made of the materials each comprising alumina as a main ingredient, wherein the regenerator is used in a regenerative combustion burner being fired with alternately and repeatedly operations of heat storage by the passage of high-temperature flue gas in a fixed time and heating of combustion air by passage of the combustion air in a next fixed time; and the regenerator is used under the condition that the aforesaid flue gas includes metal dust;

the alumina purity in the material for the high-temperature part of the regenerator where the flue gas is exceeding 1200° C. is not less than 98%, that for the medium-temperature part of the regenerator where the flue gas is exceeding 1100° C. and not higher than 1200° C. is 95%, and the material for the low-temperature part of the regenerator where the flue gas is not higher than 1100° C. is cordierite.

The fourth invention is characterized that the porosity in the high-temperature part is not more than 20%, and the porosity in the medium temperature part is not more than 50%.

The fifth inventions is characterized by the fact that, in a regenerator made of the materials each comprising alumina as a main ingredient, wherein the regenerator is used in a regenerative combustion burner being fired with alternately and repeatedly operations of heat storage by the passage of high-temperature flue gas in a fixed time and heating of combustion air by passage of the combustion air in a next fixed time; and the regenerator is used under the condition that the aforesaid flue gas does not include metal dust;

the alumina purity in the material for the high-temperature part of the regenerator where the flue gas is exceeding 1300° C. is not less than 95%, and the material for the low-temperature part of the regenerator where the flue gas is not higher than 1300° C. is cordierite.

The sixth invention is characterized that the porosity in the high-temperature part is not more than 20%.

BRIEF DESCRIPTION OF THE DRAWINGS

FIGS. 8 are graphs which show the time change of the crack number, wherein

BEST MODE FOR CARRYING OUT THE INVENTION

First, the principle of this invention will be explained.

Table 1 shows a result of examining the flue gas temperature at which the cordierite is softened under the load of 1 kg/cm$^2$ with or without the metal dust such as iron, sodium or calcium in the flue gas.

TABLE 1

| Existence or nonexistence of metal dust | No metal dust | Existence of Metal Dust | | |
|---|---|---|---|---|
| Kind of dust | | Iron | Sodium Calcium | Copper |
| Softening Point | 1300° C. | | 1120–1150° C. | |

As clearly shown in Table 1, the softening point of the cordierite is remarkably lowered as 1120–1150° C. when the metal dust exists in the flue gas, and the usable temperature range of the cordierite in such case would be 1100° C. or less on the assumption that a safety allowance of 20° C. should be taken, while there is no use problem even in 1300° C. temperature range when the metal dust does not exist.

Figure 3:
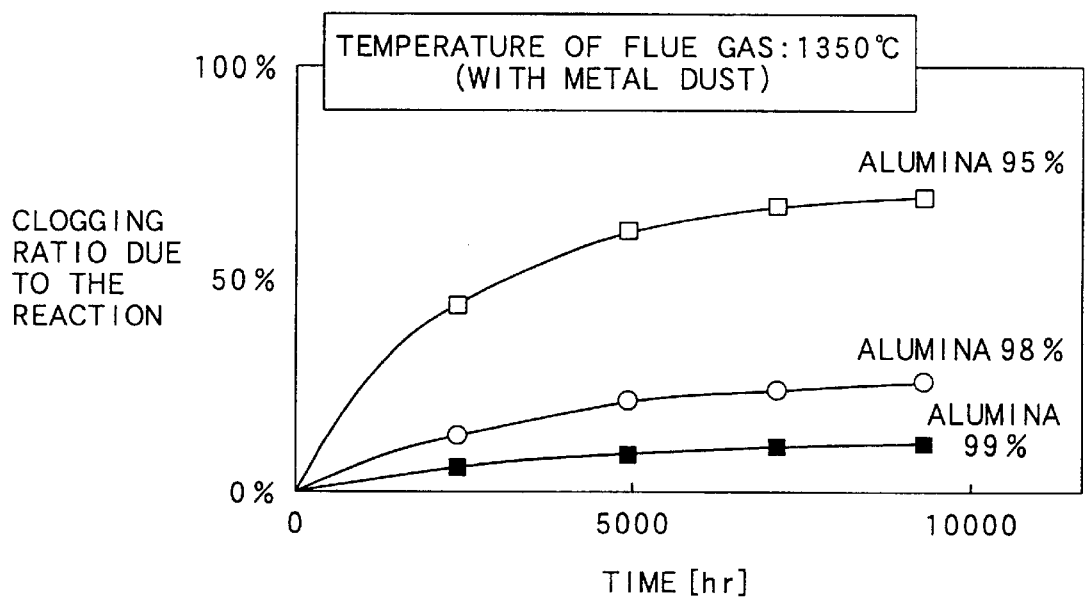
FIG. 3 is a graph which shows the time change of clogging ratio of the alumina in the flue gas (temperature of 1350° C.) containing the metal dust.
Figure 4:
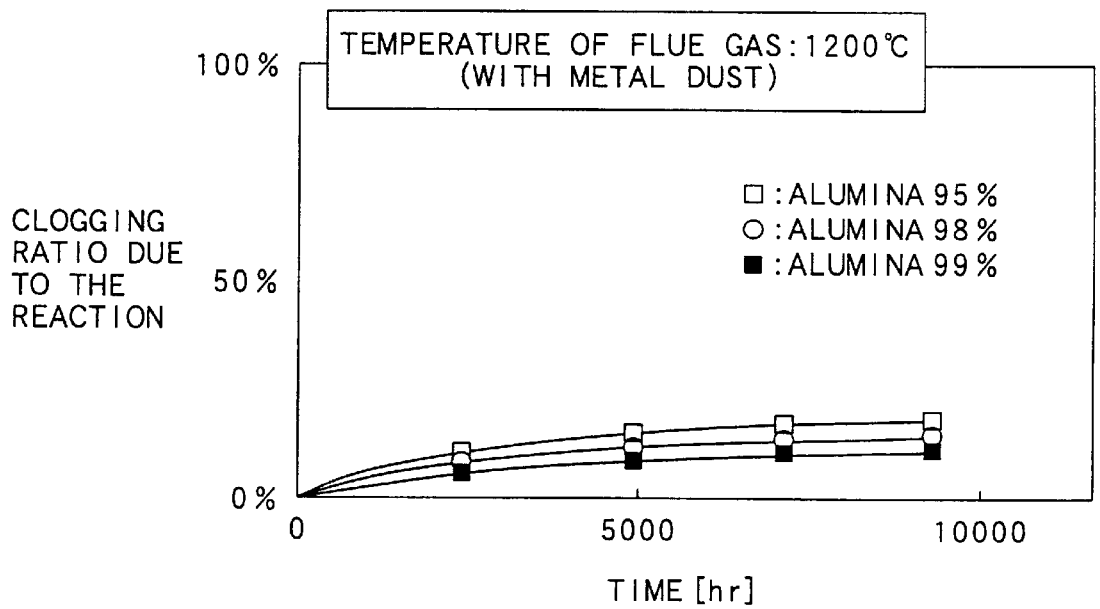
FIG. 4 is a graph which shows the time change of clogging ratio of the alumina in the flue gas (temperature of 1200° C.) containing the metal dust.
Figure 5:
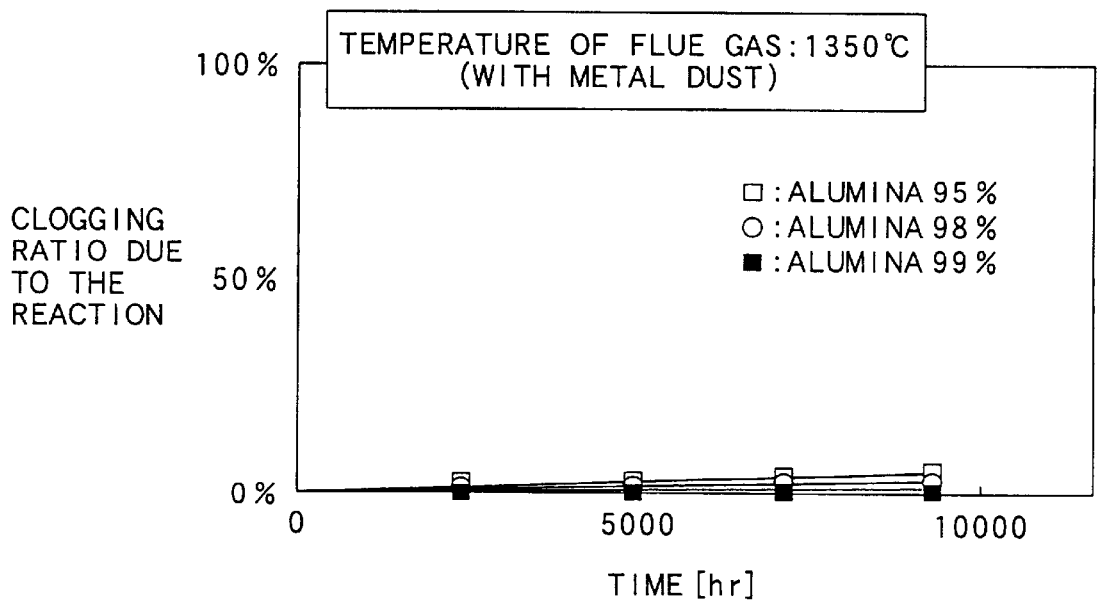
FIG. 5 is a graph which shows the time change of clogging ratio of the alumina in the flue gas (temperature of 1350° C.) containing no metal dust.

FIGS. 3, 4 and 5 are the graphs which pigeonhole as the change of the clogging ratio the relationship of conditions for alumina purity and for existence or nonexistence of metal dust, such as iron, sodium, or calcium, with the flue gas temperature, when using alumina having 10% porosity.

Figure 1:
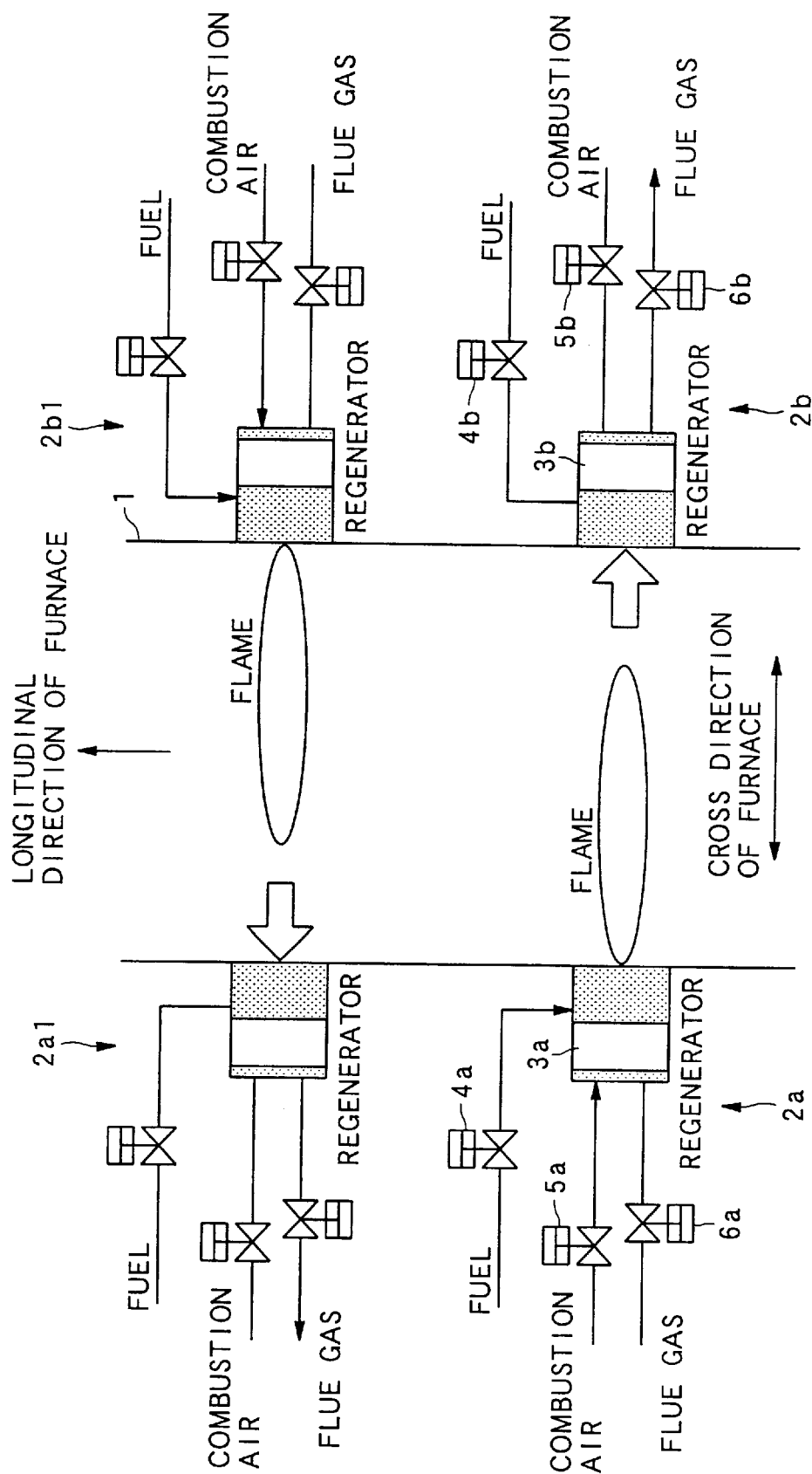
FIG. 1 is a schematic plan view which shows the heating furnace using conventional regenerative burners.
Figure 2:
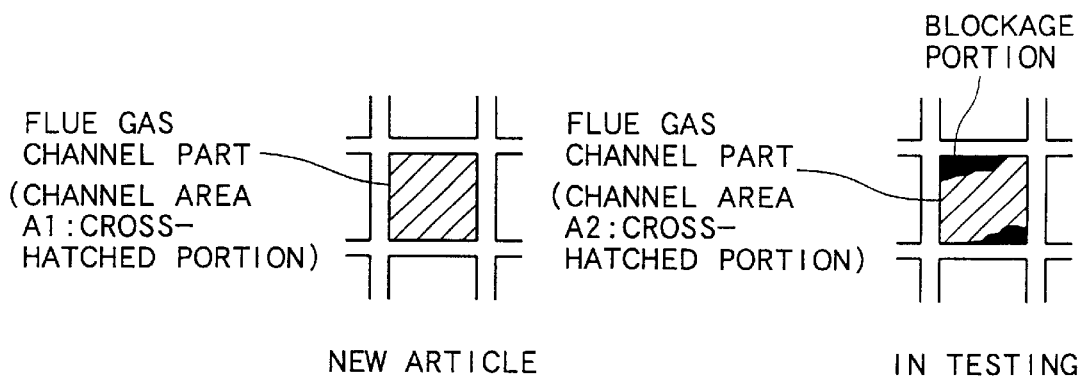
FIG. 2 is an explanatory drawing which shows the definition of clogging ratio.

The clogging ratio used herein is the ratio of blockage portions to the area of channel for passage of the flue gas, wherein the blockage portions would be arisen when the flue gas passes through the channel for heat storage. As illustrated in FIG. 2, the clogging ratio is defined in the following expression (1), assuming that A1 is the flue gas channel area of a new article, and A2 is the channel area except for the blockage portions after a fixed period for the passage of flue gas:

$$(A1-A2)/A1 \times 100 \quad (1)$$

FIG. 3 is a graph which shows the time change of clogging ratio with respect to the alumina purities of 95%, 98% and 99% in the flue gas of 1350° C. containing the metal dust.

As is clear from FIG. 3, with respect to the alumina purity of not less than 98%, it was proven that the clogging ratio was 20% or less even if it was after about 9000 hrs time course, and that the change of the clogging ratio decreased, whereas it was proven that the clogging ratio was about 70% which would be close to the condition of complete clogging with respect to the alumina purity of 95%.

FIG. 4 is a graph which shows the time change of clogging ratio with respect to the alumina purities of 95%, 98% and 99% in the flue gas of 1200° C. containing the metal dust.

As is clear from FIG. 4, it was proven that at either alumina purity, the clogging ratio was 15% or less after about 9000 hrs time course, and that the change of the clogging ratio decreased.

From these facts, we have learnt that the clogging ratio greatly changes by the flue gas temperature, when the metal dust exists.

FIG. 5 is a graph which shows the time change of clogging ratio with respect to the alumina purities of 95%, 98% and 99% in the flue gas of 1350° C. containing no metal dust.

As is clear from FIG. 5, it was proven that at either alumina purity, the clogging ratio was 10% or less after about 9000 hrs time course, and that it was the condition which is almost similar with the new article. It was proven that the clogging ratio did not increase even in the condition that the flue gas temperature is as high as 1350° C. when the flue gas did not contain metal dust.

Figure 6:
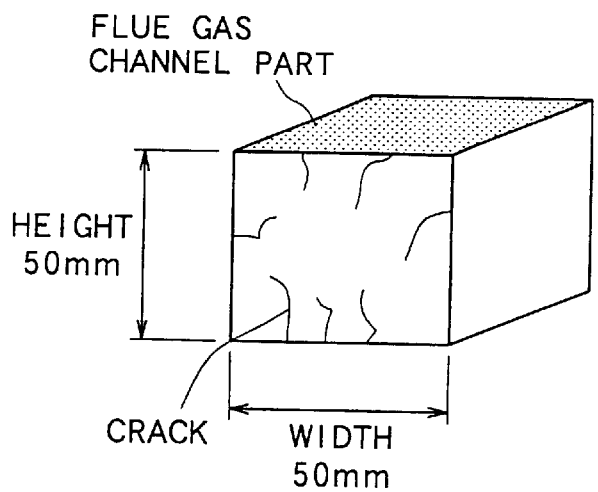
FIG. 6 is an explanatory drawing of the definition of the measurement of the crack number.

Next, the relationship of the existence or nonexistence condition of metal dust, such as iron, sodium or calcium in the flue gas, with the flue gas temperature and the porosity will be expressed as the time change of the crack number. The crack number was measured as the number of cracks existing at a flat plate portion of 50 mm height and 50 mm width as shown in FIG. 6.

Figure 7:
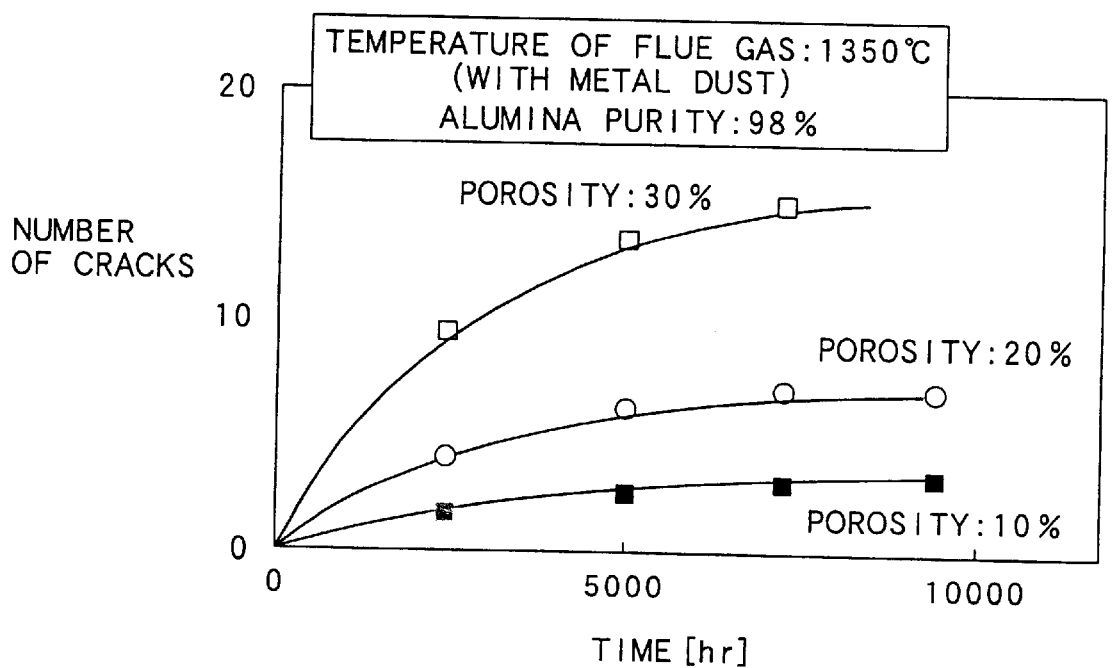
FIG. 7 is a graph which shows the time change of the crack number in the flue gas (temperature of 1350° C.) containing the metal dust.

FIG. 7 is a graph which shows the time change of crack number with respect to the alumina having purity of 98% and porosity of 10%, 20% or 30% in the flue gas of 1350° C. containing metal dust.

As is clear from FIG. 7, in case of the porosity of 20% or less, the crack number was under 10, even after about 9000 hrs time course. Further, no fallen-off piece or collapse bit was observed in the flat plate portion. In case of the porosity of 30%, a few fallen-off pieces and collapse bits in the flat plate portion were observed after about 8000 hrs time course, although such matters did not interfere with the operation. However, there was no guarantee which could continue the use until the repair is done in the next time.

From these facts, we have learnt that the life of regenerator can be further elongated by regulating the porosity of alumina for the high-temperature part to a value of not more than 20%, when the metal dust is included in the flue gas and the high-temperature part of regenerator through which the flue gas of exceeding 1200° C. is passed is made of alumina having a purity of not less than 98%.

Figure 8A:
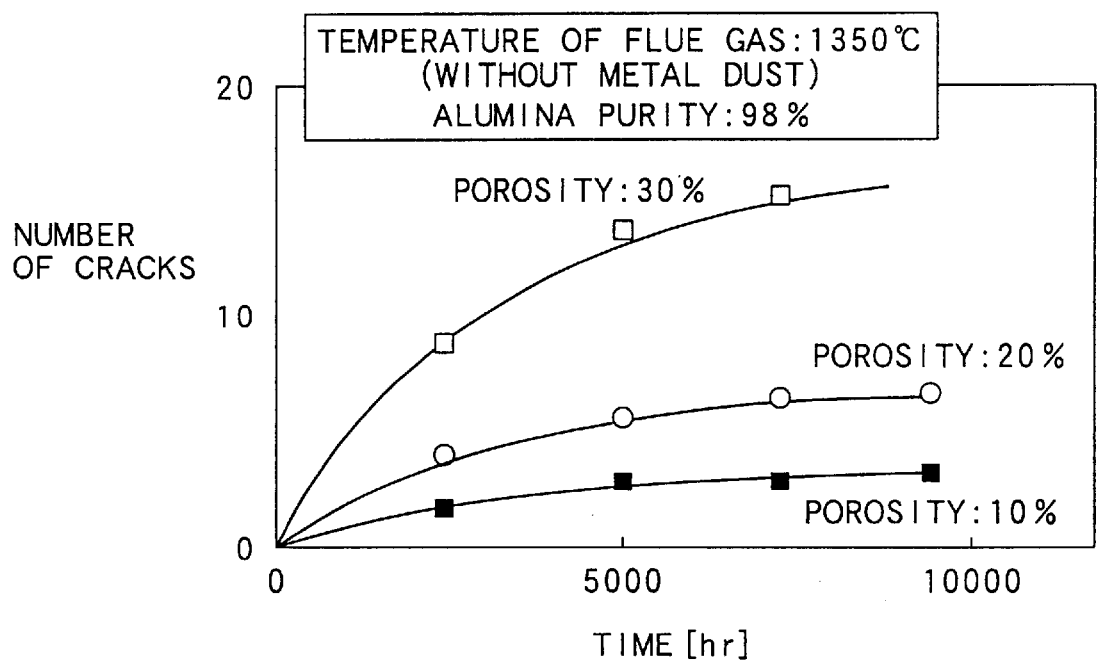
FIG. 8A is the graph which shows the time change of the crack number in case of alumina purity of 98% and without containing the metal dust in the flue gas (temperature of 1350° C.)

FIG. 8A is a graph which shows the time change of crack number with respect to the alumina having purity of 98% and porosity of 10%, 20% or 30% in the flue gas of 1350° C. containing no metal dust.

As is clear from FIG. 8A, in case of the porosity of 20% or less, the crack number was under 10, even after about 9000 hrs time course. Further, no fallen-off piece or collapse bit was observed in the flat plate portion. In case of the porosity of 30%, a few fallen-off pieces and collapse bits in the flat plate portion were observed after about 8500 hrs time course, although such matters did not interfere with the operation. However, there was no guarantee which could continue the use until the repair is done in the next time.

Figure 8B:
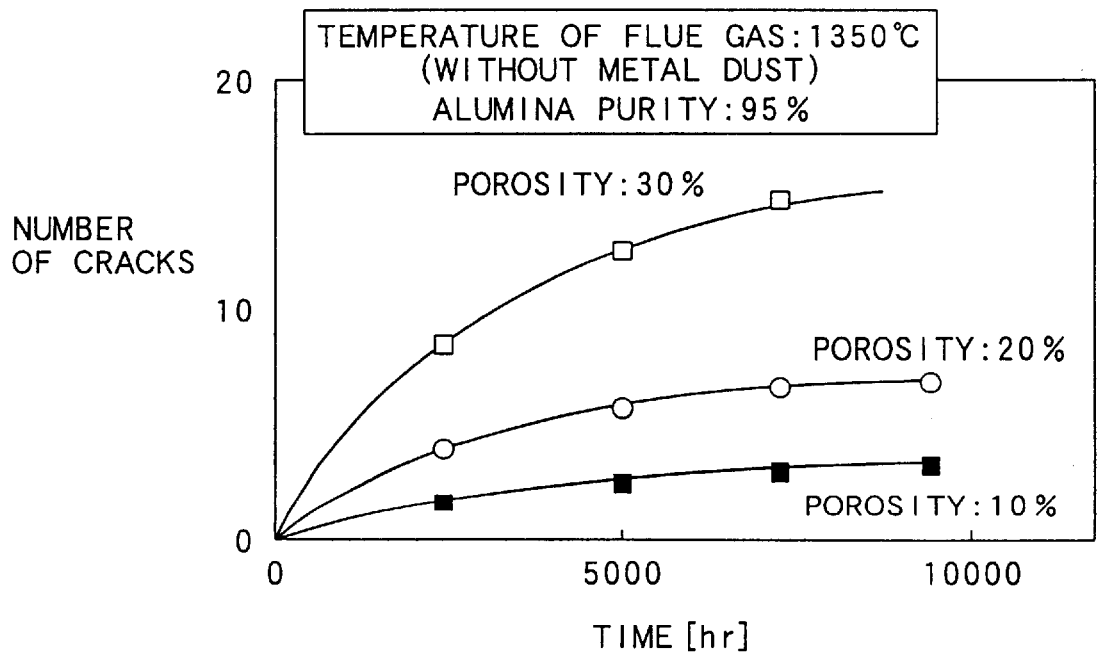
FIG. 8B is the graph which shows the time change of the crack number in case of alumina purity of 95% and without containing the metal dust in the flue gas (temperature of 1350° C.).

FIG. 8B is a graph which shows the time change of crack number with respect to the alumina having purity of 95% and porosity of 10%, 20% or 30% in the flue gas of 1350° C. containing no metal dust.

As is clear from FIG. 8B, in case of the porosity of 20% or less, the crack number was under 10, even after about 9000 hrs time course. Further, no fallen-off piece or collapse bit was observed in the flat plate portion. This result is similar with the result of alumina having 98% purity. In case of the porosity of 30%, a few fallen-off pieces and collapse bits in the flat plate portion were observed after about 8500 hrs time course, although such matters did not interfere with the operation. However, there was no guarantee which could continue the use until the repair is done in the next time.

From these facts, we have learnt that the life of regenerator can be further elongated by regulating the porosity of alumina for the high-temperature part to a value of not more than 20%, when the metal dust is not included in the flue gas and the high-temperature part of regenerator through which the flue gas of exceeding 1300° C. is passed is made of alumina having a purity of not less than 95%.

Figure 9:
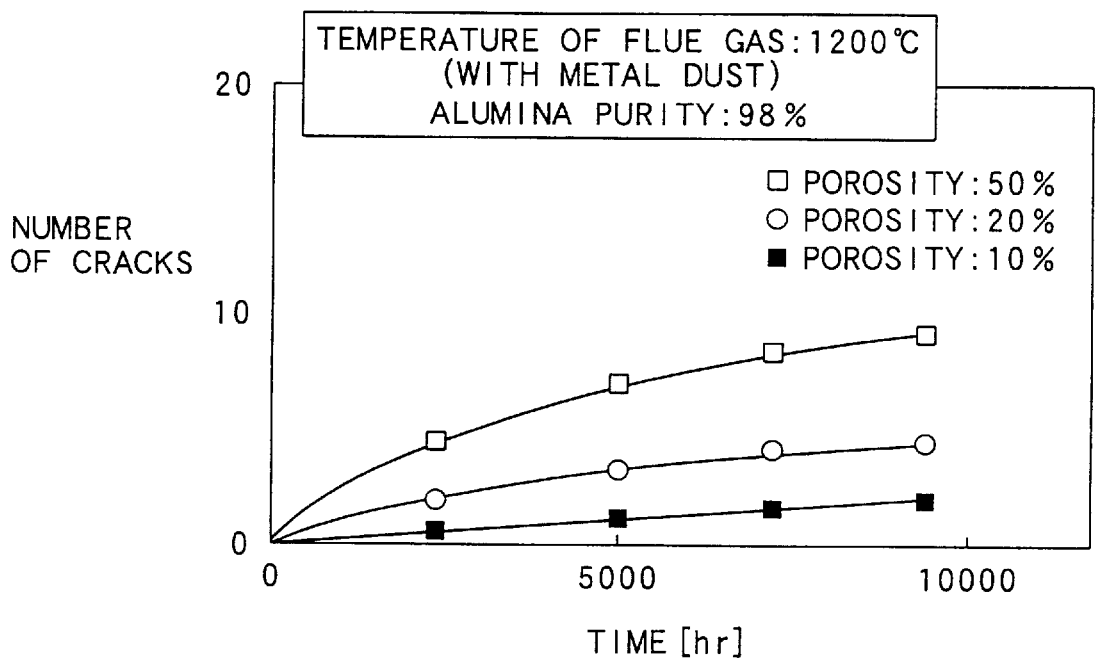
FIG. 9 is a graph which shows the time change of the crack number in the flue gas (temperature of 1200° C.) containing the metal dust.

FIG. 9 is a graph which shows the time change of crack number with respect to the alumina having purity of 98% and porosity of 10%, 20% or 50% in the flue gas of 1200° C. containing metal dust.

As is clear from FIG. 9, in all cases of 10%, 20% and 50% porosities, the crack number was under 10 after about 9000 hrs time course. Further, no fallen-off piece or collapse bit was observed in the flat plate portion in all cases.

Figure 10:
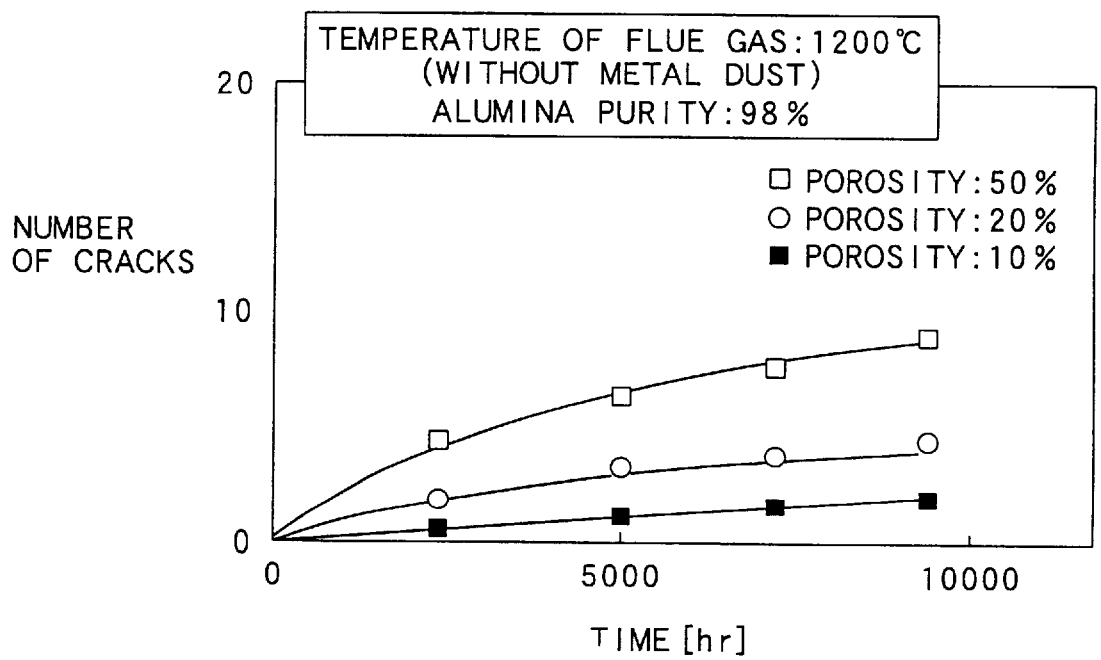
FIG. 10 is a graph which shows the time change of the crack number in the flue gas (temperature of 1200° C.) containing no metal dust.

FIG. 10 is a graph which shows the time change of crack number with respect to the alumina having purity of 98% and porosity of 10%, 20% or 50% in the flue gas of 1200° C. containing no metal dust.

As is clear from FIG. 10, in all cases of 10%, 20% and 50% porosities, the crack number was under 10 after about 9000 hrs time course. Further, no fallen-off piece or collapse bit was observed in the flat plate portion in all cases.

Figure 11:
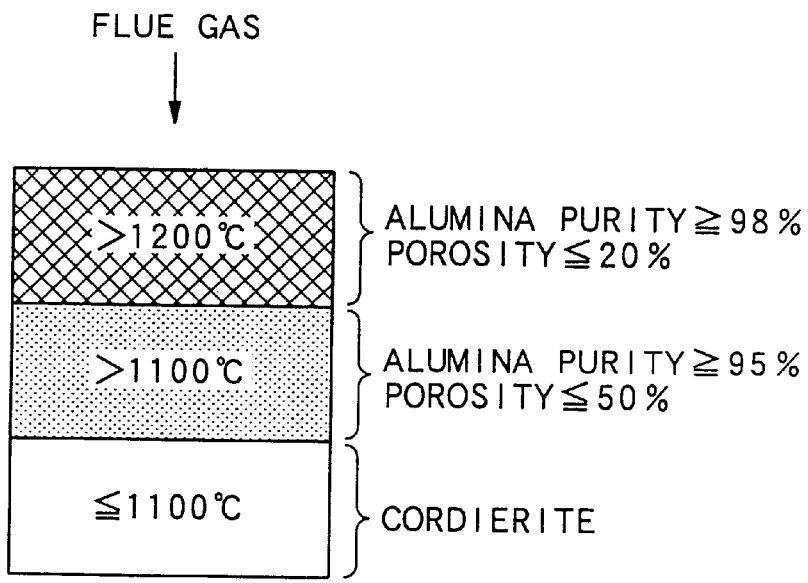
FIG. 11 is a configuration which shows an embodiment of the regenerator according to this invention in case of containing the metal dust in flue gas.

From the above results, it is the most desirable that the construction as shown in FIG. 11 is chosen for materials for the regenerator, when the metal dust is included in the flue gas. Namely, it is preferable that in the high-temperature part where the flue gas temperature exceeds 1200° C. the material used is that having an alumina purity of not less than 98% and a porosity of not more than 20%; in the medium-temperature part where the flue gas temperature is exceeding 1100° C. and not more than 1200° C. the material used is that having an alumina purity of not less than 95% and a porosity of not more than 50%; and in the low-temperature part where the flue gas temperature is not more than 1100° C. the material used is cordierite.

Figure 12:
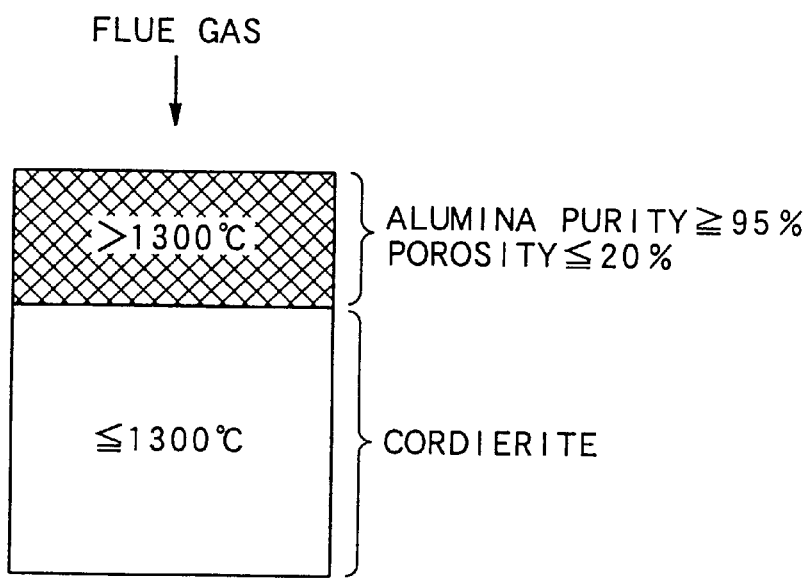
FIG. 12 is a configuration which shows another embodiment of the regenerator according to this invention in case of not containing the metal dust in flue gas.

On the other hand, it is the most desirable that the construction as shown in FIG. 12 is chosen for materials for the regenerator, when the metal dust is not included in the flue gas. Namely, it is preferable that in the high-temperature part where the flue gas temperature exceeds 1300° C. the material used is that having an alumina purity of not less than 95% and a porosity of not more than 20%; in the low-temperature part where the flue gas temperature is not more than 1300° C. the material used is cordierite.

Further more, this invention will be illustrated in more detail by some working examples.

Figure 13:
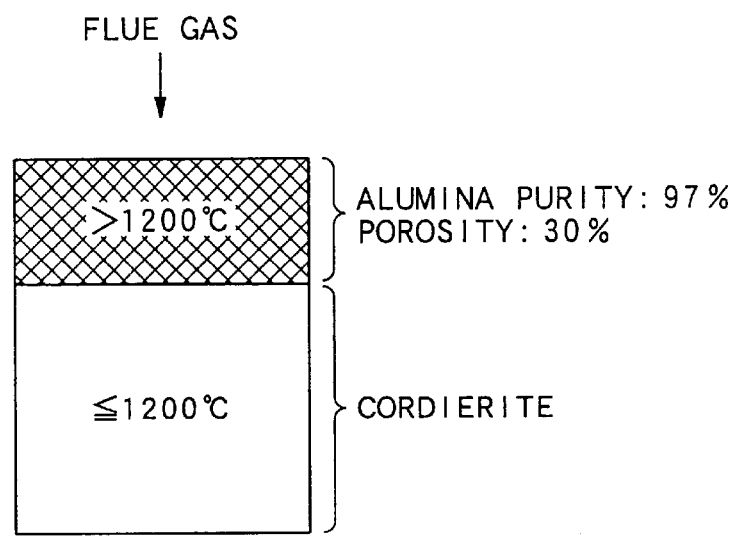
FIG. 13 is a configuration which shows a conventional regenerator.
Figure 14:
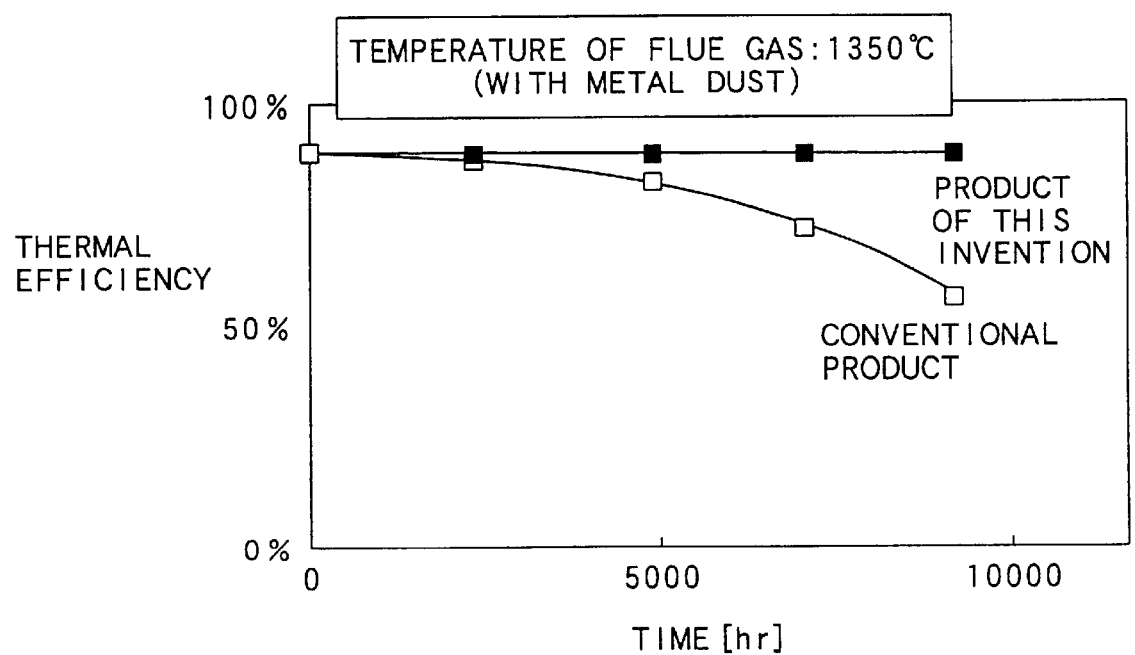
FIG. 14 is a graph which shows the time change of thermal efficiency in case of containing the metal dust in flue gas.
Figure 15:
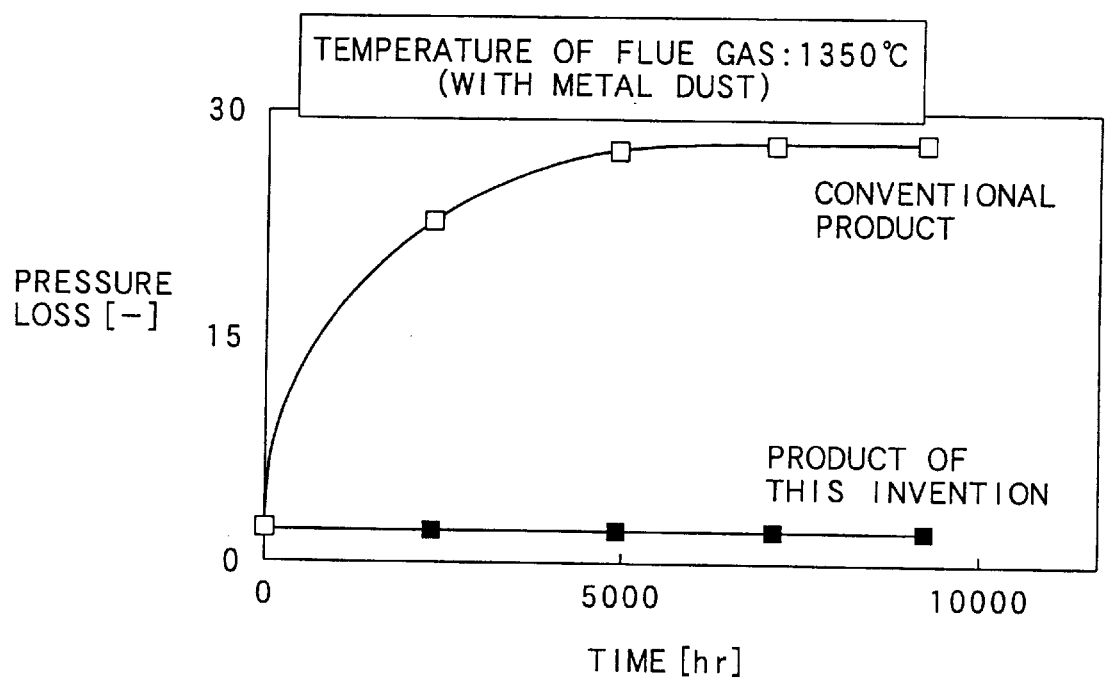
FIG. 15 is a graph which shows the time change of pressure loss in case of containing the metal dust in flue gas.

FIG. 14 is a graph which shows results of periodic measurements for the thermal efficiency, with respect both of the regenerator shown in FIG. 11 according to the present invention and the conventional regenerator shown in FIG. 13, during a long term regenerative combustion under the condition that the flue gas involved metal dust and the flue gas was at 1350° C. FIG. 15 is a graph which shows the pressure loss at that course.

As is clear from FIG. 14, with respect to the regenerator of the present invention shown in FIG. 11, a high heat recovery rate of over 90% was obtained stably even after about 9000 hrs time course, whereas in the conventional regenerator shown in FIG. 13, the thermal efficiency began to be gradually lowered at the time right after use, and the tendency changed to remarkable from the time after about 5000 hrs, and the thermal efficiency was degraded to about 60% after about 9000 hrs time course. From the time right after use, fused damage was generated in the cordierite, and cracks were generated in great numbers in the regenerator, particularly in the regenerator having alumina purity of 97% and porosity of 30% which was located at the high-temperature part, which caused the heating are a to decrease, and ended in the degradation of thermal efficiency.

FIG. 15 is a graph where results of measurement for pressure loss are compared with each other, wherein respective pressure loss data measured at every predetermined time interval and under the completely same driven condition as the beginning are represented with reference to the corresponding beginning pressure loss data which are represented therein as bases of 1.0.

As is clear from FIG. 15, with respect to the regenerator of the present invention shown in FIG. 11, the pressure loss had not varied from the beginning even after 9000 hrs time course, whereas in the conventional regenerator shown in FIG. 13, the pressure loss had showed an increasing tendency even at the time right after use. It reached 25 times what it was at beginning after about 5000 hrs time course, and the similar level was shown after about 9000 hrs time course. That was because, from the time right after use, fused damage was generated in the cordierite so as to clog the flue gas passage portion seriously.

In addition, after about 5000 hrs time course, the observed was a tendency of clogging occurrence even in the alumina regenerator having purity of 97% and porosity of 30% and located in the high-temperature part. When the metal dust is included in high-temperature flue gas, the stable use enjoying a high heat recovery and a low pressure loss can be realized by using the regenerator according to this invention, as compared with the conventional regenerator.

Figure 16:
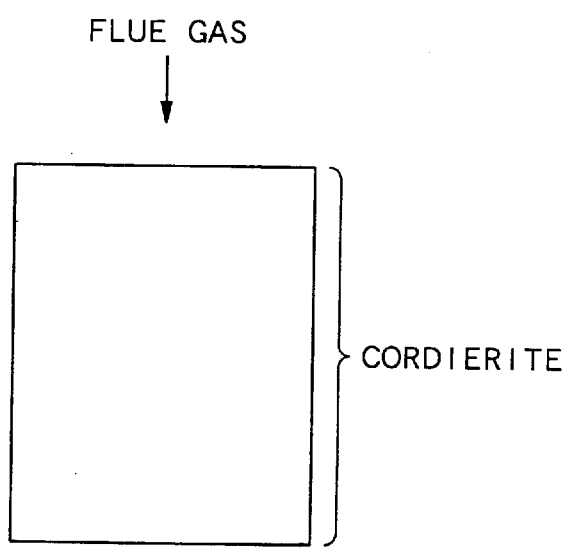
FIG. 16 is the configuration which shows another conventional regenerator.
Figure 17:
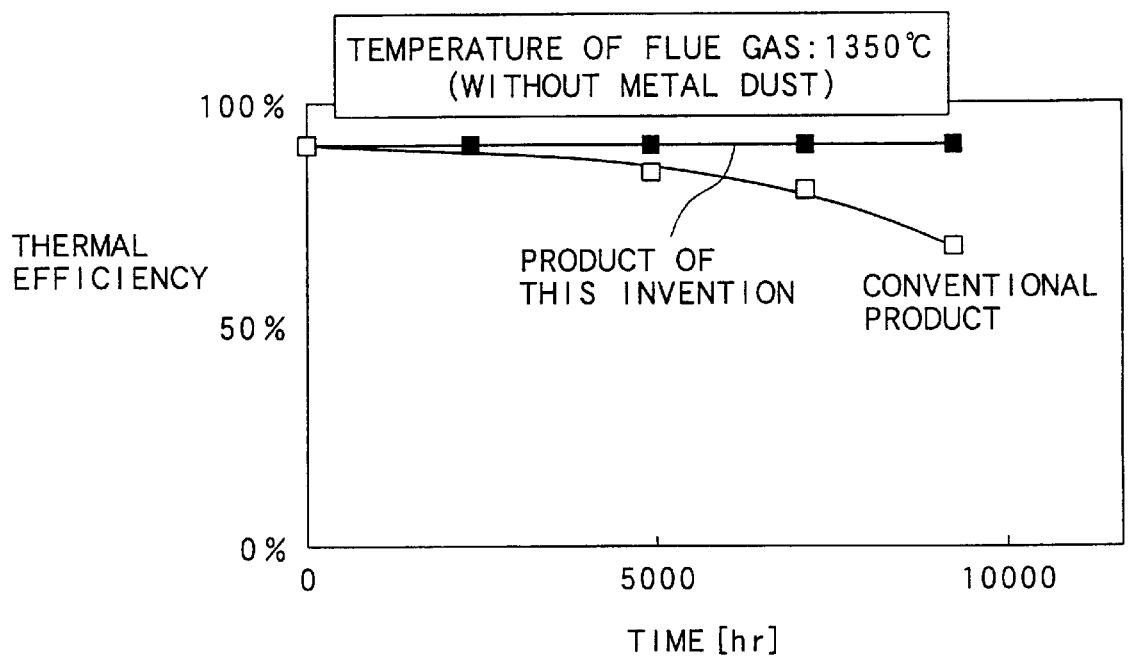
FIG. 17 is a graph which shows the time change of thermal efficiency in case of not containing the metal dust in flue gas.
Figure 18:
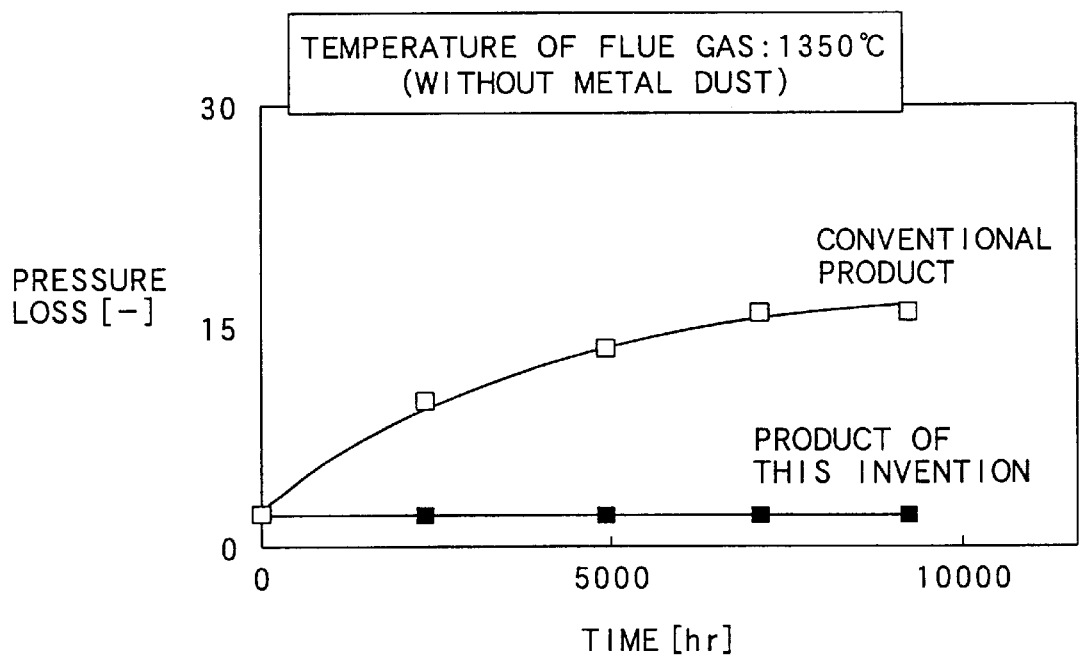
FIG. 18 is a graph which shows the time change of pressure loss in case of not containing the metal dust in flue gas.

FIG. 17 is a graph which shows results of periodic measurements for the thermal efficiency, with respect both of the regenerator shown in FIG. 12 according to the present invention and the conventional regenerator shown in FIG. 16, during a long term regenerative combustion under the condition that the flue gas involved no metal dust and the flue gas was at 1350° C. FIG. 18 is a graph which shows the pressure loss at that course.

As is clear from FIG. 17, with respect to the regenerator of the present invention shown in FIG. 12, a high heat recovery rate of over 90% was attained stably even after about 9000 hrs time course, whereas in the conventional regenerator shown in FIG. 16, the thermal efficiency began to be gradually lowered at the time right after use, and the thermal efficiency was degraded to about 70% after about 9000 hrs time course. That was because the cordierite began to be softened at the time right after use, and then the serious deformation came to the cordierite located in the high-temperature part, which facts made the regenerator fail to form a homogeneous flow of the flue gas and to facilitate the heat-exchange therein, and ended in the degradation of thermal efficiency.

FIG. 18 is a graph where results of measurement for pressure loss are compared with each other, wherein respective pressure loss data measured at every predetermined time interval and under the completely same driven condition as the beginning are represented with reference to the corresponding beginning pressure loss data which are represented therein as bases of 1.0.

As is clear from FIG. 18, with respect to the regenerator of the present invention shown in FIG. 12, the pressure loss had not varied from the beginning even after 9000 hrs time course, whereas in the conventional regenerator shown in FIG. 18, the pressure loss had showed an increasing tendency even at the time right after use. After about 9000 hrs time course, it reached 15 times what it was at beginning. That was because, from the time right after use, deformation was generated in the cordierite so as to close the flue gas passage portion gradually. In this case, the stable use enjoying a high heat recovery and a low pressure loss can be realized, as in the case of involving metal dust in the flue gas, by using the regenerator according to this invention, as compared with the conventional regenerator.

As described above, the present invention brings about the following useful effects.

With respect to the regenerator, made of materials each comprising alumina as a main ingredient, and used for the regenerative combustion burner which is fired with alternately and repeatedly operations of heat storage by the passage of high-temperature flue gas in a fixed time and heating of combustion air by passage of the combustion air in a next fixed time, the life of its material which would be a ceramics generally is influenced greatly by the temperature and atmosphere conditions used. Therefore, by adopting an optimum construction after clarifying the durability of alumina under a given alumina purity, given porosity, given atmosphere temperature and given condition for existence or nonexistence of the metal dust, or after clarifying the working condition of cordierite under a given atmosphere temperature and given condition for existence or nonexistence of the metal dust, the regenerator have been actualized, with an elongated life time enjoying, a stable heat recovery and low pressure loss maintaining in the long term, as compared with the conventional regenerator.

What is claimed is:

1. Regenerator for regenerative combustion burner;
    wherein said regenerative combustion burner being fired with alternately and repeatedly operations of heat storage by the passage of high-temperature flue gas in a fixed time and heating of combustion air by passage of the combustion air in a next fixed time,
    wherein said regenerator being made of the materials each comprising alumina as a main ingredient, and
    wherein said regenerator being used under the condition that the flue gas includes metal dust;
    which regenerator is characterized by the fact that the alumina purities in the materials for the regenerator are lowered in the order, the high-temperature, medium-temperature and low-temperature parts of the regenerator.

2. Regenerator according to claim 1, wherein the porosity of said high-temperature part is lower than that of the medium-temperature part.

3. Regenerator for regenerative combustion burner;

wherein said regenerative combustion burner being fired with alternately and repeatedly operations of heat storage by the passage of high-temperature flue gas in a fixed time and heating of combustion air by passage of the combustion air in a next fixed time, wherein said regenerator being made of the materials each comprising alumina as a main ingredient, and wherein said regenerator being used under the condition that the flue gas includes metal dust;

which regenerator is characterized by the fact that the alumina purity in the material for the high-temperature part of the regenerator where the flue gas is exceeding 1200° C. is not less than 98%, that for the medium-temperature part of the regenerator where the flue gas is exceeding 1100° C. and not higher than 1200° C. is 95%, and the material for the low-temperature part of the regenerator where the flue gas is not higher than 1100° C. is cordierite.

4. Regenerator according to claim 3, wherein the porosity in the high-temperature part is not more than 20%, and the porosity in the medium temperature part is not more than 50%.

5. Regenerator for regenerative combustion burner;

wherein said regenerative combustion burner being fired with alternately and repeatedly operations of heat storage by the passage of high-temperature flue gas in a fixed time and heating of combustion air by passage of the combustion air in a next fixed time, wherein said regenerator being made of the materials each comprising alumina as a main ingredient, and wherein said regenerator being used under the condition that the flue gas includes no metal dust;

which regenerator is characterized by the fact that the alumina purity in the material for the high-temperature part of the regenerator where the flue gas is exceeding 1300° C. is not less than 95%, and the material for the low-temperature part of the regenerator where the flue gas is not higher than 1300° C. is cordierite.

6. Regenerator according to claim 5, wherein the porosity in the high-temperature part is not more than 20%.

* * * * *